United States Patent Office 3,418,237
Patented Dec. 24, 1968

3,418,237
SETTLING OF NON-ARGILLACEOUS ORE PULPS AND MINERAL SUSPENSIONS BY USE OF WATER-SOLUBLE ACRYLIC POLYMERS
Robert B. Booth and John M. Dobson, Stamford, Conn., assignors to American Cyanamid Company, New York, N.Y., a corporation of Maine
No Drawing. Filed Dec. 22, 1953, Ser. No. 399,836
22 Claims. (Cl. 210—54)

This application is a continuation-in-part of our applications Ser. No. 296,082, filed June 27, 1952, now abandoned, and Ser. No. 386,678, filed Oct. 16, 1953, now abandoned.

This invention relates to an improvement in the settling of minerals which are predominantly non-argillaceous in nature from water suspensions thereof or from ore pulps and ore slimes containing the same and also relates to the settling of chemical precipitates from aqueous suspensions thereof.

In the ore dressing art, various hydraulic methods are employed to effect concentration or separation of solid ore materials. Frequently the separation process takes the form of a sedimentation process which is usually carried out by introducing the ore pulps or slimes into suitable tanks and allowing them to remain therein for a sufficient period of time to permit the solid particles to settle to the lower portion of the tank. Batches of the ore pulps or slimes may be treated separately or the operations may be conducted in a continuous manner by continuously introducing the ore pulps or slimes into a suitable vessel and continuously withdrawing the solids as they settle to the lower portion and continuously withdrawing the supernatant liquid from the upper portion of the vessel.

In these gravity methods of concentration, the speed and efficiency with which separation is effected depend upon the rate at which the solid materials settle from the ore pulps and ore slimes. Therefore, a method that increases the rate of settlement will also improve the efficiency of the concentration or separation.

Another procedure for effecting the concentration or more complete separation of solid ore particles is by means of filtration where the water content of the ore materials must be reduced to a somewhat greater degree than is accomplished by the above-mentioned sedimentation process. Certain flotation concentrates and tailings, residues from leaching, waste products from hydrometallurgical processes, etc., for example, retain water so strongly that filtration times are excessive, which adds greatly to the cost of operation. As a result, a filter cake is produced with a high water content, which is difficult to handle in subsequent mineral dressing operations or in further refining steps as the water cannot be removed therefrom in any economically practical filtration time.

In our application Ser. No. 296,082, filed June 27, 1952, now abandoned, there is described a method of dewatering or thickening, that is, either by settling or filtration, of finely-divided mineral suspensions wherein the suspensions are treated with a linear polymer having at least three carboxylic acid groups per molecule and which causes the mineral particles to flocculate so as to settle out very rapidly in the thickening operation or to be more easily filtered from large volumes of water.

We have now found, contrary to the teachings of our earlier application, that the settling of ore pulps or suspensions of mineral materials with the described polymers was imperfectly understood and is not of such universal applicability as was first supposed. In other words, while many of the therein-described polymers work very effectively in the settling of some ores and mineral suspensions, it has now been found that if the ore pulp contains predominant amounts of argillaceous minerals, such ore pulps do not respond to treatment with the polymers so that an effective settling and/or filtration thereof can be carried out. Just why mineral suspensions or ore pulps containing predominant amounts of clayey materials cannot be effectively settled by the use of the polymers is not known. It is believed, however, that large amounts of clay interfere with the action of the polymers in some not well understood manner so that an effective concentration of the desired mineral values cannot be accomplished by settling and/or filtration when predominant amounts of argillaceous minerals are present.

The present invention, therefore, is directed to the settling-filtration of mineral suspensions or ore pulps wherein the minerals present are predominantly non-argillaceous in nature. By "predominantly non-argillaceous" we mean that up to about 25% argillaceous material may be tolerated in the mineral suspensions. If more than about 25% argillaceous material is present, either the settling operation is so slow as to be impracticable on a commercial scale or no settling at all takes place, and, therefore, the concentration of the desired minerals in the ore pulp cannot be accomplished by a thickening operation.

The polymers which we have found to be effective in the settling or filtration of suspensions of minerals which are predominantly non-argillaceous in nature, examples of which are described more fully hereinafter, are water-soluble polymers of a compound represented by the formula

C=C—R wherein R is selected from the group consisting of nitrile, amide, and carboxyl radicals, COOM wherein M is a lower alkyl radical preferably from 1 to 4 carbon atoms, and the water-soluble salts thereof.

Suitable acrylic polymers for use in the present invention may be obtained by polymerizing acrylic acid or by polymerizing derivatives having groups which are hydrolyzable to acids, such as, for example, acrylonitrile, esters of acrylic acid, etc. Other highly suitable polymers are polyacrylamides. The acrylic acid or acrylamide may be polymerized to form homopolymers or may be copolymerized with small amounts of other compounds, such as vinyl pyridine, vinyl acetate, styrene, vinyl ethers, vinyl halides, or unsaturated hydrocarbons such as isobutylene.

Practical and highly useful acrylic polymers in carrying out the present invention are hydrolyzed polyalkyl acrylates wherein the alkyl group contains from 1 to 4 carbon atoms, polyacrylic acid, polyacrylamide, the sodium salt of hydrolyzed polyacrylonitrile, acid-hydrolyzed polyacrylonitrile, acrylic acid-acrylamide copolymers and alkali-hydrolyzed polyacrylamide. The preparation of polyacrylic acid and polyacrylamide is, of course, well known and need not be described herein. Polyacrylic acids and polyacrylamides of low, medium, and high viscosities, or molecular weight ranges have been used satisfactorily in the practice of the present invention.

The sodium salt of hydrolized polyacrylonitrile is preferably prepared by subjecting polyacrylonitriles to an alkali hydrolysis with caustic soda. The hydrolysis is carried to approximately 75% completion or, in other words, about three out of every four of the nitrile groups are hydrolyzed to carboxylic acid groups.

The acid-hydrolyzed polyacrylonitriles are preferably prepared by heating polyacrylonitrile in concentrated sulfuric acid at 70°–80° C. so as to form an acrylic polymer wherein about 70–75% of the nitrile groups are hydrolyzed to amide groups, the resulting products being closely similar to ordinary polyacrylamide.

Copolymers of acrylic acid-acrylamide may be prepared by copolymerizing monomeric acrylic acid and acrylamide. Or, substantially similar polymers may be prepared by the alkaline hydrolysis of polyacrylamide wherein the hydrolysis of the amide groups to carboxylic acid groups may be carefully controlled so as to produce the requisite ratio of carboxyl to amide groups in the polymer.

Among the effective acrylic polymers are those which are obtained by hydrolyzing polymeric material containing polyacrylonitrile. These compounds are cheap and give excellent results. Here again, the polymer may be a homopolymer or the acrylonitrile may be copolymerized with small amounts of other materials, such as vinyl pyridine, acrylic esters and the like. It should be noted that the products obtained by hydrolyzing polymers such as polyacrylonitriles are not completely identical with the corresponding polymers obtained by polymerizing acrylic acid. Both types are, however, useful in the present invention.

It is an advantage of the present invention that the hydrolyzed polyacrylonitriles may be of low grade. It is thus possible to use polyacrylonitriles which have insufficient purity for other uses, such as fibers. The possibility of using these normally discarded, off-grade products makes a source of cheap material available for use in the present invention. Where the amount of by-product, off-grade material is not sufficient to supply the demand and the acrylic polymers must be made directly, it is usually found that the homopolymer of acrylonitrile is somewhat cheaper to make than the copolymers.

The amount of acrylic polymer that is used in either the settling or filtration operation appears to be quite critical. The lower limit is set only by the fact that sufficient polymer must be used to obtain the desired degree and quickness of flocculation. The upper limit, however, is much more critical in that we have found that when the concentration of polymer becomes excessive, the net effect on the finely-divided minerals is reversed and that instead of forming aggregates or flocs, the polymer in settling operations appears to act as a deflocculating or dispersing agent for the suspended particles, and in filtration it appears to function as a water sealer, and, therefore, loses its utility so far as the present invention is concerned. Apparently when large concentrations of the acrylic polymer are used, it functions in a manner similar to that when it is employed in maintaining the deflocculation of such materials as oil well drilling muds and the like, where concentrations of the order of 40–100 lb./ton of solids are employed. As applied in oil drilling fluids, the polymer functions to prevent the loss of water from the muds rather than to promote dewatering as is required in the treatment of the present invention.

In settling operations, the foregoing-described acrylic polymers may be employed in amounts ranging from about 0.005 lb./ton to about 10 lb./ton by weight of suspended mineral solids, but optimum results are, in general, obtained by the use of from 0.01 lb./ton to 5 lb./ton. In no case have we found that the amount should exceed about 10 lb./ton because not only does the cost increase excessively but as stated hereinbefore a deflocculating effect takes place.

With respect to filtration operations, in general, we have found that amounts of acrylic polymers much above about 5 lb./ton produce an undesired effect on the suspension whereby the suspension connot be readily filtered. The effect in filtration appears to be somewhat similar to that obtained in the settling operations hereinabove referred to, namely, that when too large a concentration of polymer is used, the net effect of the polymers on the minerals is reversed and no practicable filtration thereof can be accomplished. Therefore, in filtration operations we prefer to use the acrylic polymers in amounts ranging from about 0.005 lb./ton to about 5 lb./ton, the preferred range and the one that is operable on most ores being of the order of about 0.01 lb./ton to about 2 lb./ton.

The function of the acrylic polymers apparently is to form mobile aggregates of flocs of the solids suspended in the pulps which permit them to settle very rapidly in the thickening operation. In the filtration operation, the polymers appear to act as filter aids in that the water can be filtered from the treated finely-divided minerals at a rate considerably in excess of untreated material. Moreover, the resulting filter cake is hard and firm and thus may be more easily handled in subsequent operations. The filter cake from untreated material is frequently a rather thick fluid mass which is almost impossible to process or handle. It is an advantage of this treatment that the filtration times of the treated minerals are so much shorter than the filtration times of untreated minerals. For example, it has been found that by adding a very small amount of the acrylic polymer to various predominantly non-argillaceous mineral products it is possible to increase the filtration rate by as much as 150%.

For optimum beneficial effect, the molecular weight of the described polymers is of some importance in flocculating, settling, and filtering the mineral solids from the hereinafter described ore pulps and mineral suspensions. It appears that the molecular weight should be at least about 10,000 in order to secure the desired results. The upper molecular weight limit does not appear to be at all critical and is set only by the practical difficulty of making extremely highly polymerized polymers. Polyacrylonitriles having calculated molecular weights up to about 820,000 have been satisfactorily used in the practice of the present invention. Those polymers having molecular weights much in exces of this value are difficult to get into solution or to form dispersions thereof in water. Thus, the insoluble or nondispersible polymers are not included herein. However, so long as the polymer is water-soluble or water-dispersible, it is operable in carrying out the present invention.

The exact point at which the polymers are added to the ore pulps is not particularly critical. In settling, thickening, or filtration operations, they can be added to the liquid suspension at any time prior to or during the settling, thickening or filtration operations, the only precaution being that there be sufficient distribution of the polymers so that they are brought into contact with the mineral solids. The invention is not limited to any particular method of introducing the polymers and this flexibility of application constitutes one of the advantages of the invention.

Those acrylic polymers which are carboxylic in nature, such as polyacrylic acid and the sodium salt of hydrolyzed polyacrylonitrile, have been successfully used in the settling-filtration of the following ore pulps or water suspensions containing predominantly non-argillaceous minerals: sulfide ores containing copper, lead, zinc and iron sulfides; precious metal ores such as slimy gold and silver ores or ore pulps resulting from the cyanidation of precious metal ores; cyanidation tailings containing pyrite, gold and uranium bearing materials; iron washer overflows; anthracite and bituminous coal wastes; lead, zinc, copper and iron sulfide flotation concentrates and tailings; industrial sands and the waste products from their preparation and use; chemical precipitates such as fine calcium carbonate, suspensions of zinc oxides and mixed zinc oxide-sulfides, precipitates of lime and magnesium salts which commonly form in solutions used in the cyanidation of precious metal ores and from the chemical treatment of hard waters, calcium sulfate, barium sulfate, precipitates of fine sulfides and uranium precipitates as are formed by the addition of alkalies such as ammonia and caustic to solutions of uranium salts. These polymers also are useful in treating manganese ore slimes, suspensions of fine fluorite ores, cement rock, phosphate slimes, fine ferrosilicon and magnetite used in heavy media separation processes, various mineral-containing industrial and domestic wastes, etc.

The specificity of the described polymers in effecting settling of only those ore pulps or mineral suspensions containing minerals which are predominantly non-argillaceous in nature is illustrated by their use in the treatment of clay slurries for example. As illustrated in one of the examples which follow, it has been found that the described acrylic polymers are completely ineffective in settling mineral suspensions when the amount of argillaceous materials present exceeds about 25%.

With respect to the solids content of the ore pulps or mineral suspensions which respond to treatment by the present invention, it has been found that the density thereof is not particularly critical as good results have been obtained at high solids and at low solids. For example, effective settling and filtration have been obtained when the solids content of the ore pulp is as low as about 0.025% or as high as about 30–50% solids.

The pH of the ore pulps or mineral suspensions which respond to treatment by the present invention is a factor of some importance in the effective settling-filtration of the minerals with the acrylic polymers. Polymers containing predominantly carboxylic acid groupings such as the sodium salt of hydrolyzed polyacrylonitrile and polyacrylic acid have been found effective in settling alkaline pulps, neutral pulps and slightly acidic pulps. In other words, these particular polymers are generally most effective when the pH of the pulp ranges from a pH of about 13 down to a pH of about 5 or 6. Polyacrylamides, copolymers of acrylamide-acrylic acid, alkali-hydrolyzed polyacrylamides, and certain acid-hydrolyzed polyacrylonitriles, on the other hand, are extremely effective settling-filtration agents over a pH range of from 13 or above down to a pH of 1 or below. Thus, the polyacrylamide-type polymers appear to be more universal settling-filtration agents for ore pulps which are either alkaline, neutral or strongly acid in nature. That is to say, the polyacrylamide-type polymers, in general, produce more rapid flocculation, settling and filtration of non-argillaceous minerals in alkaline, neutral and acid circuits than does the sodium salt of hydrolyzed polyacrylonitrile, and, in addition, work very effectively in strongly acid circuits, that is, circuits having a pH of from 4 or 5 down to a pH of 1 or below and where the sodium salt of hydrolyzed polyacrylonitrile is ineffective as a settling or filtration agent.

It is an important advantage of the present invention that the polyacrylamide-type polymers work so effectively in the settling-filtration of acidic ore pulps and acidic mineral suspensions. This is true because many such ores and mineral products are subjected to an acid treatment or acid-leaching step in conventional ore dressing operations so as to render the mineral values therein more amenable to recovery.

In addition to their successful application in alkaline and neutral suspensions, the foregoing polyacrylamide-type polymers also have been successfully used in the treatment of the following acidic suspensions of non-argillaceous minerals and acidic ore pulps: pulps made from weathered ores and mineral products; acid-leached gold ores; acid-leached copper ores; copper flotation concentrates; acid-leached copper slimes; copper tailings and acid-leached copper residues; acid-leached vanadium ores; water- or acid-leached zinc sulfide concentrates; acid-leached cyanidation tailings containing pyrite, gold and uranium-bearing materials; acidic titanic sulfate digestion residues from crude titaniferous materials such as ilmenite ore concentrates; acidic suspensions of anthracite culm, acidic anthracite and bituminous coal wastes and colliery effluents, zinc refinery sludges, flotation products, zirconium oxide, iron oxide slimes, mineral suspensions in acidic mine waters, the uranium precipitates hereinabove referred to, iron precipitates, etc.

In the treatment of the described ores and mineral suspensions in acid circuits, it has been found that the polyacrylamide-type polymers must have at least 50% of their monomer units attached to amide groupings in order to be effective reagents in the settling of such ores. Pure polyacrylamide will, of course, contain no carboxyl groups, but the commercial product frequently contains from 2 to 3% carboxyl groupings. In preparing copolymers of monomeric acrylamide and acrylic acid, it is, of course, possible to vary the ratio of amide groupings to carboxylic acid groupings, and the same is also true when polyacrylamide is subjected to a controlled alkali hydrolysis. Carboxyl groups attached to monomer units may be tolerated so long as they do not exceed about 50%. In preparing acid-hydrolyzed polyacrylonitriles it is also possible to control the hydrolysis so that the resulting product contains 50% or more amide groups.

Other acrylic polymers containing 50% of their monomer units attached to amide groups that are also operable are copolymers of acrylamide-acrylonitrile, acrylamide-butyl acrylate, etc.

It is an additional advantage of the present invention that the use of the acrylic polymers frequently causes the breakdown of the mineral-bearing froth or foam at the surface of the liquid in the thickener and also brings about the flocculation and settling of the solids contained therein, thus preventing a loss of values in the thickener overflow.

The invention will be described in greater detail in conjunction with the following specific examples in which the parts are by weight unless otherwise specified.

Example 1

An ore predominantly quartz in composition was settled at about 20% solids with 0.05 lb./ton of the sodium salt of hydrolyzed polyacrylonitrile and with polyacrylamide in separate 30-minute tests. As shown in the following table, these agents improved the settling rate of the ore.

The quartz ore was then diluted with 12.5%, 25%, 50% and 75% of clay and similar settling tests conducted. The presence of the clay definitely decreased the settling rate of the suspended material as shown by the following data. Similar tests were conducted on the clay alone, and no settling took place as also shown in the following table.

It will be noted that the addition of 25% clay was about the limit that could be tolerated so as to allow improved settling of the ore over that of the control tests, and that such improvement was only observed toward the end of the 30-minute test period.

| Time, Minutes | Volume (cc.) of Settled Solids | | | |
|---|---|---|---|---|
| | Control [1] | PAN [2] | PAM [3] | |
| Start | 1,000 | 1,000 | 1,000 | ⎫ |
| 5 | 1,000 | 780 | 550 | ⎪ |
| 10 | 910 | 610 | 448 | ⎬ Quartz ore only. |
| 20 | 835 | 418 | 365 | ⎪ |
| 30 | 755 | 378 | 330 | ⎭ |
| Start | 1,000 | 1,000 | 1,000 | ⎫ |
| 5 | 980 | 900 | 875 | ⎪ |
| 10 | 968 | 825 | 748 | ⎬ Quartz ore containing 12.5% clay. |
| 20 | 935 | 680 | 558 | ⎪ |
| 30 | 905 | 560 | 500 | ⎭ |
| Start | 1,000 | 1,000 | 1,000 | ⎫ |
| 5 | 980 | 985 | 985 | ⎪ |
| 10 | 968 | 975 | 978 | ⎬ Quartz ore containing 25% clay. |
| 20 | 932 | 915 | 908 | ⎪ |
| 30 | 900 | 780 | 780 | ⎭ |
| Start | 1,000 | 1,000 | 1,000 | ⎫ |
| 5 | 985 | 985 | 982 | ⎪ |
| 10 | 965 | 975 | 972 | ⎬ Quartz ore containing 50% clay. |
| 20 | 945 | 950 | 952 | ⎪ |
| 30 | 930 | 932 | 932 | ⎭ |
| Start | 1,000 | 1,000 | 1,000 | ⎫ |
| 5 | 995 | 995 | 995 | ⎪ |
| 10 | 992 | 990 | 992 | ⎬ Quartz ore containing 75% clay. |
| 20 | 990 | 988 | 990 | ⎪ |
| 30 | 988 | 982 | 986 | ⎭ |
| Start | 1,000 | 1,000 | 1,000 | ⎫ |
| 5 | 1,000 | 1,000 | 1,000 | ⎪ |
| 10 | 1,000 | 1,000 | 1,000 | ⎬ Clay only. No settling. |
| 20 | 1,000 | 1,000 | 1,000 | ⎪ |
| 30 | 1,000 | 1,000 | 1,000 | ⎭ |

[1] Control test; no chemicals added.
[2] Sodium salt of hydrolyzed polyacrylonitrile.
[3] Polyacrylamide.

Example 2

A slimy gold ore typical of the so-called desert ores of the western United States was treated at a pulp density of 15% solids (pH=8.6) with 0.25 lb./ton of the sodium salt of a high viscosity hydrolyzed polyacrylonitrile and allowed to settle in a 1000 cc. graduated cylinder. A similar test was conducted using 0.25 lb./ton of the sodium salt of a medium viscosity polyacrylonitrile. Both these tests were compared with a control test using 12.0 lb./ton hydrated lime and one to which no chemicals were added. As the pulp settled, the volumes of settled solids in each cylinder were noted as follows:

| Time, Minutes | Volume (cc.) of Settled Solids | | | |
|---|---|---|---|---|
| | 12.0 lb./ton Lime | No Agent | Medium Viscosity Polymer | High Viscosity Polymer |
| 20 | 920 | 1,000 | 410 | 420 |
| 40 | 845 | 1,000 | 350 | 360 |
| 60 | 770 | 1,000 | 325 | 330 |
| 100 | 610 | 1,000 | 300 | 300 |
| 120 | 570 | 1,000 | 290 | 290 |

It will be noted that without agents no settling occurred. With both polymerized products good settling occurred as indicated by the relatively small volume occupied by the settled solids. It will be noted that the polymers were more effective than 48 times as much hydrated lime by weight.

Example 3

A sulfide ore from the Philippine Islands containing lead, zinc, and iron sulfides together with a slimy gangue was ground and treated with 0.2 lb./ton of the sodium salt of hydrolyzed polyacrylonitrile. In separate tests at 15% solids, high, medium and low viscosity polymers were used in a test method similar to that outlined in Example 2. The pH was 7.5. Good settling was obtained as follows:

| Time, Minutes | Volume (cc.) of Settled Solids | | | |
|---|---|---|---|---|
| | No Agent | High Viscosity | Medium Viscosity | Low Viscosity |
| 20 | 920 | 850 | 845 | 855 |
| 40 | 860 | 760 | 770 | 780 |
| 60 | 780 | 650 | 655 | 645 |
| 120 | 630 | 510 | 500 | 525 |
| 180 | 590 | 325 | 335 | 340 |

Example 4

A similar treatment was given a 3% suspension of the slimes (pH=7.0) removed in the processing of phosphate rock. With 0.10 lb./ton of the sodium salt of hydrolyzed polyacrylonitrile effective settling was obtained in 20 minutes on this slime which ordinarily requires several hours to settle.

Similar results were obtained on a 2% suspension of fine calcium carbonate with 0.15 lb./ton of the acrylic polymer. Likewise, a 2.5% suspension of a mixed zinc oxide and zinc sulfide product was effectively settled with 0.10 lb./ton of the polymer.

In all the above cases the supernatant liquids were suitable for recycling for treating mineral products or might be discharged without creating a pollution hazard.

Hydrolyzed polymethyl-, polyethyl-, polypropyl-, and polybutyl-acrylates in amounts of 0.1–0.25 lb./ton gave results generally similar to those obtained with the sodium salt of hydrolyzed polyacrylonitrile.

Example 5

The pulp (pH=11.0) resulting from the cyanidation of the desert ore described in Example 2 was treated with 0.3 lb./ton of a product containing about 80% of a hydrolyzed acrylic polymer. A portion of the resulting pulp, equivalent in weight to 300 grams of the dry ore, was washed on to an 8-inch Buchner funnel and filtered. Simultaneously a sample of the original pulp untreated with the polymer was filtered.

It was possible to filter and wash thoroughly (two 100 cc. portions of fresh water added as wash) the polymer treated sample in 35 minutes as compared to 215 minutes for the untreated pulp. The filter cake from the treated sample was more granular and more easily handled than that from the untreated pulp.

Example 6

A slimy Nevada gold ore, well known for its slow filtration rate, was chosen for filtration studies. A 600-gram lot of this ore at a pulp density of 50% solids (pH=7.5) was diluted with 100 ml. of water and agitated with 0.2 lb./ton of the sodium salt of hydrolyzed polyacrylonitrile for 1 minute. The conditioned pulp was filtered under a pressure of 25 lb./square inch of nitrogen. The filtrate was collected in a graduated cylinder so as to allow periodic determinations of the total volume of the filtrate removed. Also, a control test without the addition of polymer was conducted for purposes of comparison. The tests were discontinued after 200 minutes.

The following table summarizes the results of these tests and shows considerable increase in the filtration rates in the case of the polymer-treated pulp.

| Time, Minutes | Volume (ml.) of Filtrate | |
|---|---|---|
| | Control Test (No Polymer) | Sodium Salt of Hydrolyzed Polyacrylonitrile |
| 1 | 4.5 | 13 |
| 6 | 13 | 32 |
| 12 | 20 | 46 |
| 20 | 26 | 60.5 |
| 30 | 33 | 75 |
| 40 | 38.5 | 87 |
| 50 | 43 | 99 |
| 60 | 49 | 112 |
| 70 | 56 | 137 |
| 85 | 62 | 187 |
| 90 | 63 | 191 |
| 100 | 67 | 200 |
| 120 | 74 | 218 |
| 140 | 81 | [1]234 |
| 160 | 86.5 | |
| 180 | 93 | |
| 200 | 99.5 | |

[1] Filtration complete.

Example 7

A sample of pulp (600 grams of dry solids) from the cyanidation of a South African gold ore containing 50% solids and 0.03% NaCN and 0.04% CaO (pH=11) was agitated with 0.3 lb./ton of the sodium salt of hydrolyzed polyacrylonitrile for 1 minute and filtered as in Example 6. A similar filtration test was conducted on the same pulp from which the polymer was omitted. An increase in the filter rate of 37.0% was noted for the treated sample. Both filter cakes were removed from the filters and repulped with 600 ml. fresh water (no polymer present) and refiltered. The pulp originally treated with the polymer again showed a filtration rate 28.6% faster than the untreated pulp, indicating that the effect of the polymer continued in the second cycle of filtration as well as the first cycle where it had been applied originally.

Example 8

A South African ore containing pyrite, gold, uranium-bearing minerals, quartz, chloritoid and chlorite group minerals was used in a series of filtration tests. Representative samples of 600-grams of ore, about 70% minus 200 mesh, were agitated at about 30% solids (pH=9.5) with varying quantities of the below listed polymers and filtered in a laboratory vacuum filter. The filter cakes were washed with 200–250 ml. of water and filtration continued until the surface of the filter cake was dry. A control test without added polymer was conducted for purposes of comparison. The following table summarizes the results of these tests:

| Type Polymer Used | Lb./Ton | Percent Increase in Filtration Rate |
|---|---|---|
| Sodium Salt of Hydrolyzed Polyacrylonitrile | 0.05 | 11.5 |
| Do | 0.10 | 25.6 |
| Do | 0.33 | 43.4 |
| Do | 0.50 | 40.8 |
| Do | 1.0 | 51.0 |
| Polyacrylamide (Viscosity=388 cps.) | 0.33 | 41.2 |
| Polyacrylamide (Viscosity=1,040 cps.) | 0.33 | 61.9 |
| Polyacrylamide (Viscosity=5,040 cps.) | 0.33 | 59.7 |
| Ammonium Polyacrylate | 0.33 | 26.3 |
| Diethanol Ammonium Polyacrylate | 0.33 | 13.5 |
| Guanidinium Polyacrylate | 0.2 | 5.7 |
| Polyacrylic Acid (Viscosity=620 cps.) | 0.2 | 23.7 |
| Polyacrylic Acid (Viscosity=9,000 cps.) | 0.2 | 47.6 |

Example 9

600-gram samples of finely ground ores and mineral products listed below were treated with 0.33 lb./ton of the sodium salt of hydrolyzed polyacrylonitrile at pulp densities ranging from 30 to 50% solids and filtered under vacuum. The filter cakes were washed with 250 cc. of water and filtration continued until the surface of the filter cake became dry. Filtration was then stopped and the volume of filtrate measured. A control test without treatment with the polymer was conducted for purposes of comparison:

| Material Filtered | Time of Test, Minutes | Volume (ml.) of Filtrate With Polymer | Volume (ml.) of Filtrate Without Polymer |
|---|---|---|---|
| Minnesota Iron Washer Overflow | 1.3 | 485 | 180 |
| Coal | 1.5 | 900 | 395 |
| Flotation Concentrate (Lead, Zinc, Iron Sulfides) | 3.0 | 350 | 225 |
| Gold Ore Slimes | 35.0 | 530 | 210 |
| Tailing from Flotation of a Telluride Gold Ore | 7.3 | 550 | 440 |
| Fine Calcium Carbonate | 7.5 | 710 | 350 |

Example 10

Samples of the black water obtained in scrubbing a foundry sand were used in a series of settling tests. The suspended material in this case was mainly the carbonized and charred matter resulting from the action of heat during the molding operation on the binders in the sand, fine silica and sand particles, and decomposed ingredients of the sand mold. Ten minute settling tests were run on separate 1 liter samples containing 2.0 lbs. lime/1000 gallons, 2.0 lbs. lime/1000 gallons and 0.2 lb./1000 gallons of the sodium salt of hydrolyzed polyacrylonitrile, and also no additives (control test). In a 10-minute test settling was as follows:

Treatment: Volume (cc.) of Supernatant liquid
 None _____ No settling.
 Lime _____ 430
 Lime and polymer _____ 815

The settled solids in the polymer-treated sample were well flocculated and more readily disposable than in the other two tests.

Example 11

Settling tests using polyacrylamide and the sodium salt of hydrolyzed polyacrylonitrile as settling agents were conducted on an ore containing a small amount of pyrite in a gangue composed mainly of quartz with some predominantly non-argillaceous silicate minerals. 1000 parts by volume of separate samples of ore pulp containing 210 parts by weight of minus 200 mesh ore were treated with these polymers in amounts equivalent to 0.05 lb./ton and then allowed to settle for 30 minutes. A control test without polymers was also conducted. A series of such tests was conducted in the pH range of 9.5 down to 1.9 which was controlled by the addition of sulfuric acid to the ore pulp. The results of these tests are given in the following table.

| | Time, Minutes | Volume (cc.) of settled portions | | |
|---|---|---|---|---|
| | | Control Test | Sodium Salt of Hydrolyzed Polyacrylonitrile | Poly-acrylamide |
| pH=9.5 | 10 | 1,000 | 590 | 465 |
|  | 20 | 910 | 415 | 385 |
|  | 30 | 825 | 365 | 350 |
| pH=7.9 | 10 | 892 | 660 | 465 |
|  | 20 | 800 | 452 | 385 |
|  | 30 | 702 | 390 | 348 |
| pH=6.8 | 10 | 868 | 642 | 483 |
|  | 20 | 740 | 428 | 390 |
|  | 30 | 625 | 378 | 350 |
| pH=6.0 | 10 | 840 | 600 | 462 |
|  | 20 | 705 | 430 | 370 |
|  | 30 | 590 | 390 | 332 |
| pH=4.9 | 10 | 890 | 860 | 492 |
|  | 20 | 770 | 730 | 360 |
|  | 30 | 660 | 630 | 328 |
| pH=3.9 | 10 | 902 | 905 | 470 |
|  | 20 | 818 | 815 | 375 |
|  | 30 | 730 | 735 | 338 |
| pH=2.8 | 10 | (¹) | (¹) | 352 |
|  | 20 |  |  | 300 |
|  | 30 |  |  | 278 |
| pH=1.9 | 10 | (¹) | (¹) | 358 |
|  | 20 |  |  | 298 |
|  | 30 |  |  | 275 |

¹ No sharp separation between solids and liquids took place with unacceptably large amounts of solids in the supernatant liquids.

The above data show that the settling of the ore was considerably improved over the control by both polyacrylamide and the sodium salt of hydrolyzed polyacrylonitrile at pH values of about 4.9. At a pH of 3.9 the settling rate with the sodium salt of hydrolyzed polyacrylonitrile was about equal to that of the control test; whereas polyacrylamide continued to give the improved settling rates demonstrated at high pH values. At a pH of 2.8 and 1.9 the control samples and the test samples using the sodium salt of hydrolyzed polyacrylonitrile did not settle sufficiently so as to produce a sharp separation between the solids and the liquids so that no clear cut line of differentiation between the settled and suspended portions could be observed in these tests. With polyacrylamide, however, at these low pH values the settling was definite and rapid with only slightly cloudy supernatant liquids.

Similar results were obtained on a second ore of this same type in which the pH range was varied from 7.5 down to 0.15.

Example 12

Settling tests using 0.02 lb./ton of the sodium salt of hydrolyzed polyacrylonitrile, polyacrylamide, and a copolymer of acrylamide-acrylic acid (85:15) were conducted on the same ore as used in Example 11 by the same procedure as Example 11 except that additions of lime and sodium hydroxide were made to change the pH. The results of these settling tests follow:

|  | Time, Minutes | Volume (cc.) of Settled Portions | | | |
|---|---|---|---|---|---|
|  |  | Control Test | Poly-acrylamide | Acrylamide-Acrylic Acid Copolymer | Sodium Salt of Hydrolyzed Polyacrylamide |
| Lime added to pH=10.2 | 10 | 888 | 450 | 625 | 640 |
|  | 20 | 790 | 375 | 460 | 450 |
|  | 30 | 695 | 345 | 375 | 390 |
| Lime added to pH=11.0 | 10 | 775 | 428 | 520 | 450 |
|  | 20 | 592 | 365 | 372 | 385 |
|  | 30 | 468 | 338 | 348 | 355 |
| Lime added to pH=12.0 | 10 | 788 | 438 | 565 | 460 |
|  | 20 | 620 | 388 | 412 | 400 |
|  | 30 | 490 | 360 | 385 | 378 |
| Lime added to pH=12.5 | 10 | 785 | 428 | 600 | 780 |
|  | 20 | 600 | 373 | 420 | 595 |
|  | 30 | 455 | 350 | 390 | 435 |
| NaOH added to pH=10.2 | 10 | 915 | 522 | 598 | 595 |
|  | 20 | 848 | 420 | 450 | 430 |
|  | 30 | 780 | 378 | 368 | 355 |
| NaOH added to pH=11.0 | 10 | 865 | 415 | 530 | 603 |
|  | 20 | 738 | 348 | 368 | 408 |
|  | 30 | 618 | 318 | 330 | 360 |
| NaOH added to pH=12.0 | 10 | 773 | 380 | 525 | 618 |
|  | 20 | 587 | 328 | 360 | 395 |
|  | 30 | 450 | 305 | 330 | 360 |

It will be noted that in the above high pH ranges, improved settling was obtained with the polymers over the control. Also the above pH readings are uncorrected, and the actual pH is higher than shown. For example, the pH of 12.5 uncorrected is above 13+ on correction.

Example 13

The ore pulp described in Example 11 was treated at a pH of 2.4 with small quantities of polyacrylamide and allowed to settle for 30 minutes. The test results are summarized in the following table.

| Time, Minutes | Polyacrylamide, lb./ton | | | | |
|---|---|---|---|---|---|
|  | None | 0.0025 | 0.0013 | 0.0005 | 0.00025 |
|  | Volume (cc.) of Settled Portions | | | | |
| Start | 1,000 | 1,000 | 1,000 | 1,000 | 1,000 |
| 10 | 635 | 515 | 510 | 540 | 595 |
| 20 | 472 | 380 | 382 | 400 | 432 |
| 30 | 380 | 330 | 335 | 332 | 350 |

As indicated by these tests only relatively small quantities of polyacrylamide are required to effect flocculation and improve settling, particularly in the early stages of the tests. The clarity of the supernatant liquid also was improved by the use of polyacrylamide.

The same ore was similarly treated in a series of tests using larger quantities of polyacrylamide. The test results follow:

| Time, Minutes | Polyacrylamide, lb./ton | | | | | | |
|---|---|---|---|---|---|---|---|
|  | 0.05 | 0.1 | 0.25 | 1.0 | 2.5 | 5.0 | 10.0 |
| Start | 1,000 | 1,000 | 1,000 | 1,000 | 1,000 | 1,000 | 1,000 |
| 10 | 510 | 455 | 380 |  | 508 | 475 | 460 |
| 20 | 395 | 375 | 320 | 325 | 388 | 380 | 360 |
| 30 | 358 | 338 | 295 | 300 | 340 | 342 | 222 |

It will be noted that good settling was obtained with up to 10 lb./ton of polyacrylamide.

Example 14

A gold ore was leached with 1000 lb./ton of sulfuric acid to remove certain cyanicides. The residue from this leaching operation (pH=1.0) was settled effectively by the use of polyacrylamide (medium molecular weight range) and by a polyacrylamide product prepared by heating 1 part by weight polyacrylonitrile in 100 parts by volume of concentrated sulfuric until complete solution of the polyacrylonitrile occurred. The settling obtained with these materials on 1000 parts by volume separate samples of ore containing 200 parts by weight solids are summarized in the following table.

| Time, Minutes | Materials Added to Leach Residue | | |
|---|---|---|---|
|  | None | 0.05 lb./ton Polyacrylamide | 0.075 lb./ton Acid-treated Polyacrylonitrile |
|  | Volume (cc.) of Settled Portions | | |
| 10 | 915 | 880 | 885 |
| 20 | 830 | 755 | 760 |
| 30 | 765 | 660 | 655 |
| 40 | 675 | 580 | 585 |
| 50 | 595 | 545 | 540 |
| 60 | 575 | 520 | 515 |
| Condition of Supernatant Liquid | Dirty | Clear | Clear |

It will be observed that the treated samples showed increased settling rates and improved clarity of the supernatant liquid. The above polymers have also given settling rates equal or better than 5 times as much glue on these leach residues.

Example 15

Various products obtained in the treatment of copper ores were treated with polyacrylamide and allowed to settle. The results of these tests are shown below.

Copper ore

A suspension of a finely ground copper ore of pH= 0.8–0.9 was treated with polyacrylamide and the polyacrylamide product obtained by acid treatment by polyacrylonitrile in amounts equivalent of 0.075 lb./ton and allowed to settle. The pulp contained about 15% solids.

| Time, Minutes | Volume (cc.) of Settled Portions | | |
|---|---|---|---|
|  | Control (no additions) | Poly-acrylamide | Acid-treated Polyacrylonitrile |
| Start | 250 | 250 | 250 |
| 10 | 246.5 | 246 | 226 |
| 20 | 242 | 238 | 198.5 |
| 30 | 233 | 213 | 172 |
| 40 | 223 | 195 | 158 |
| 55 | 204 | 167 | 147 |
| 70 | 182 | 153 | 141 |
| Condition of Supernatant Liquid | Cloudy | Clear | Clear |

Copper ore slimes

A freshly mined copper ore was crushed and washed with acidic mine water to remove the slime portions. A suspension of slimes resulted having a pH of 3 and of a solids content of about 10%. Samples of this suspension was treated with polyacrylamide in amounts equivalent to 0.025 and 0.05 lb./ton and allowed to settle over a two-hour period. Settling rates as compared to those of untreated pulp are given in the following table.

| Time, Minutes | Lb./ton Polyacrylamide | | |
|---|---|---|---|
| | None (Control test) | 0.025 | 0.05 |
| | Volume (cc.) of Settled Portions | | |
| Start | 1,000 | 1,000 | 1,000 |
| 10 | 970 | 945 | 880 |
| 20 | 925 | 900 | 750 |
| 30 | 895 | 860 | 650 |
| 45 | 846 | 803 | 530 |
| 60 | 798 | 748 | 427 |
| 75 | 751 | 691 | 368 |
| 90 | 705 | 635 | 345 |
| 120 | 662 | 578 | 330 |
| Condition of Supernatant Liquid | Cloudy | Clear | Clear |

Mixed copper flotation concentrate

A copper concentrate (pH=4.0) obtained by the treatment of a mixed sulfide-oxide copper ore by the conventional leaching-precipitation-flotation process was conditioned with polyacrylamide in an amount equivalent to 0.05 lb./ton and with a polyacrylamide product obtained by treating polyacrylonitrile with sulfuric acid in an amount equivalent to 0.05 lb./ton. The coarse portions without the treatments settled readily but left in suspension the finer fractions which would represent a considerable loss in copper when discharged as thickener overflows in operating practice. Separate 250 parts by volume samples of this concentrate were used and the test results obtained are as follows:

| Time, Minutes | Volume (cc.) of Settled Portions | | |
|---|---|---|---|
| | Polyacrylamide | Acid-treated Polyacrylonitrile | Control (no additions) |
| Start | 250 | 250 | 250 |
| 3 | 158 | 164 | 202 |
| 6 | 112 | 115 | 160 |
| 9 | 85 | 88 | 123 |
| 12 | 78 | 80 | 101 |
| Condition of Supernatant Liquid | Clear | Clear | Dirty |

Flotation tailings

The tailings obtained from the froth flotation of a copper ore at a pH of 3.5 were treated with polyacrylamide in an amount equivalent to 0.03 lb./ton and allowed to settle. The time required for the tailings pulp to thicken to 40% solids, simulating the plant discharge, was noted.

| | Minutes |
|---|---|
| Control test without treatment | 24 |
| With the polymer treatment | 12.5 |

Copper leaching residues

The residues, about 20% solids, remaining after an acid-leaching operation on a copper ore (pH=2.3) were similarly treated and the time required for thickening to 40% solids was noted:

| | Minutes |
|---|---|
| Control test without treatment | 55 |
| Treatment with 0.04 lb./ton polyacrylamide | 29 |

Marked improvement in settling rates were observed in all cases where the polymers were added to the suspensions.

Example 16

A pyrite-containing ore was ground to about 95% minus 200 mesh and floated to recover the iron-sulfur values. The resulting concentrate was cleaned by reflotation to improve the grade in iron and sulfur. The three products of flotation, the cleaned concentrate and the tailings from cleaning and roughing operations were finely divided and difficult to settle. The pH of these materials was 3.0. 1000 parts by volume samples of these three products were treated with polyacrylamide and allowed to settle. The time required for the pulps to thicken to 40% solids, suitable for discharge, was noted.

These tests are summarized in the following table.

| | Clean. Conc. | Clean. Tail. | Rough Tail. |
|---|---|---|---|
| Percent Solids at Start of Test | 4.8 | 2 | 10.1 |
| Lb./ton Polyacrylamide | 0.035 | 0.04 | 0.05 |
| Settling Time, Minutes | 15 | 22 | 25 |
| Condition of Supernatant Liquid | Clear | Clear | Clear |

Without the polyacrylamide, the settling times were about 2 to 3 times longer and the supernatant liquids were dirty, which in the case of the concentrate represented a loss in iron-sulfur values.

Example 17

The residues obtained by treating zinc sulfide concentrates by roasting followed by leaching (pH=4.0) were settled with polyacrylamide and the polyacrylamide product obtained by treating polyacrylonitrile in sulfuric acid in amounts equivalent to 0.1 lb./ton. The results of these tests are given in the following table and, as indicated, a marked improvement in settling was obtained.

| Time, Minutes | Volume (cc.) of Settled Portions | | |
|---|---|---|---|
| | Control Test | Polyacrylamide | Acid-treated Polyacrylonitrile |
| Start | No settling observed | 250 | 250 |
| 15 | | 120 | 115 |
| 30 | | 74 | 70 |

Example 18

A cyanidation tailing, containing pyrite, a small amount of gold, quartz, sericite, and silicates of iron, magnesium, and aluminum, and small quantities of uranium-bearing material was leached with sulfuric acid (pH=1.0–1.5) and settled with polyacrylamides of various degrees of polymerization as indicated by the viscosities of 20% solution (800; 10,100; 32,000 and 100,000 cps.). A dried polyacrylamide obtained from the 32,000 cps. material was also used. 1,000 parts by volume samples of the leached tailing were conditioned with amounts equivalent to 0.05 lb./ton of the various polyacrylamides in separate tests and allowed to settle for 2 hours. Periodic readings of the volume of the settled solids were taken over the test period. Control tests were conducted on a sample of unleached tailings and on a sample of the tailings after leaching (no polyacrylamide treatment). The test results follow:

TREATMENT

| Time, Minutes | Control Tests | | 0.05 lb./ton Polyacrylamide | | | | |
|---|---|---|---|---|---|---|---|
| | Unleached Tailing | Leached Tailing | Viscosity, cps. | | | | |
| | | | 800 | 10,100 | 32,000 | 100,000 | Dried |
| | Volume (cc.) of Settled Portions | | | | | | |
| 10 | 905 | 940 | 895 | 885 | 875 | 840 | 745 |
| 20 | 825 | 850 | 815 | 780 | 760 | 695 | 580 |
| 30 | 745 | | 640 | 695 | 665 | 600 | 550 |
| 40 | 660 | 665 | 650 | 625 | 585 | 555 | 510 |
| 50 | 575 | 620 | 570 | 558 | 540 | 530 | 495 |
| 60 | 505 | 575 | 500 | 532 | 522 | 515 | 480 |
| 75 | | 515 | | 510 | 505 | 495 | 460 |
| 90 | | 495 | | 498 | 490 | 485 | 450 |
| 120 | | 475 | 470 | 478 | 470 | 468 | 440 |
| Condition of Supernatant Liquid | Dirty | Cloudy | Clear | Clear | Clear | Clear | Clear |

It will be noted that the use of polyacrylamide improved the settling rate and the clarity of the supernatant liquid.

The above-described procedure was repeated on several samples of current and also old tailings which had been stored in piles for several years and accordingly were weathered. The results obtained were generally similar to those described above and improved settling rates and clarity of the supernatant liquids were obtained in all cases.

Example 19

Various acidic suspensions were treated with polyacrylamide and related materials and allowed to settle. The volume occupied by the settled portions of the treated materials was noted at the end of 30 minutes. For purposes of comparison a control test (no treatment) was conducted also. The summary of such tests follows:

of 5.1. At a pH of 3.0–4.0 the sodium salt of hydrolyzed polyacrylonitrile gave rates about equal to or somewhat slower than the control test whereas polyacrylamide still continued to give improved filtration rates as compared to the control test. At a pH of 2 and below the filtration characteristics of the ore changed markedly. Polyacrylamide continued to give improved results whereas the sodium salt of hydrolyzed polyacrylonitrile gave slow filtration rates.

Example 21

Filtration tests were conducted on an acid-leached ore generally similar to that described in Example 11. 600 parts by weight of minus 200 mesh ore were added to water (total volume 1000 parts) and the equivalent of 100 lb./ton sulfuric acid was added. The ore was leached 16 hours (pH=1.2) and then filtered. Just prior to filtra-

| Suspension Type | pH | Volume (cc.) | Polymer Used | Volume (cc.) in 30 Mins. of Settled Portions | |
|---|---|---|---|---|---|
| | | | | Control | Treated |
| Suspension (15% solids) of arsenic-containing gold ore after high pressure autoclaving with sulfuric acid. | 1 | 1,000 | 0.075 lb./ton Polyacrylamide | 845 | 540 |
| Suspended slimes (about 1% solids) from acid leaching of glass sands. | 1.5 | 1,000 | 0.05 lb./ton Polyacrylamide | 750 | 340 |
| Scrubbings from foundry sands; H₂SO₄ added | 4.0 | 250 | 0.3 lb./ton Polyacrylamide | 250 | 55 |
| Weathered anthracite culm (10% solids) suspended in acidic mine water. | 3.5 | 1,000 | 0.05 lb./ton Polyacrylamide | 770 | 455 |
| Acidic electrolytic refinery sludge (Abt. 5% solids) | 3.0 | 500 | 0.1 lb./ton olyacrylamide | 470 | 260 |
| Suspension (2%) of zirconium oxide | 3.0 | 500 | ____do____ | 450 | 220 |
| Suspension (4%) of iron oxide slimes | 3.5 | 1,000 | 0.07 lb./ton Copolymer of Acrylamide/Acrylic Acid. | 855 | 670 |
| Acid-leached flue dust (5% solids) | 2.1 | 1,000 | 0.07 lb./ton Acid-treated Polyacrylonitrile. | 790 | 430 |
| Acid-leached vanadium ore (11% solids) | 1.4 | 1,000 | 0.05 lb./ton Polyacrylamide | 870 | 525 |
| Bituminous coal fines (10% solids) | 3.0 | 1,000 | 0.03 lb./ton Polyacrylamide | 730 | 410 |
| Fine sulfide lead concentrate (12% solids) | 4.0 | 1,000 | ____do____ | 900 | 620 |
| Residue in acid leach liquor from treating phosphate rock | | 1,000 | 0.07 lb./ton Polyacrylamide | 880 | 390 |
| Dilute phosphoric acid from acid extraction of phosphate concentrate. | | 1,000 | 0.045 lb./ton Polyacrylamide | 910 | 440 |

Example 20

Filtration tests were conducted on a finely ground ore generally similar to that described in Example 11. The ore was treated with the sodium salt of hydrolyzed polyacrylonitrile, and with polyacrylamide in amounts equivalent to 0.1 lb./ton and filtered. 1000 parts by volume of pulp containing 600 parts by weight of ore were used. Following treatment with the polymers, the pulp was filtered on an 8-inch Buchner funnel. The filtration time was noted. The pH was varied in these tests in the range of 7.5 down to less than 1. In all cases a control test without polymers was also conducted for purposes of comparison. The results of these test are given in the following table.

| | Filtration Time, Minutes | | |
|---|---|---|---|
| pH | Control Test (no additions) | Polyacrylamide | Sodium Salt of Hydrolyzed Polyacrylonitrile |
| 7.5 | 6.8 | 5.5 | 5.2 |
| 6.1 | 6.25 | 5.3 | 5.7 |
| 5.1 | 6.6 | 5.3 | 5.7 |
| 4.0 | 6.7 | 6.25 | 7.3 |
| 3.0 | 6.9 | 5.5 | 6.8 |
| 2.0 | 12.3 | 6.5 | 14.2 |
| 1.0 | 14.75 | 7.0 | 13.6 |
| 0.15 | 10.25 | 5.5 | 12.75 |

Both polyacrylamide and the sodium salt of hydrolyzed polyacrylonitrile improved filtration rates down to a pH tion, polyacrylamide was added in varying amounts in a series of tests. The filtration time was noted as follows:

Polyacrylamide, lb./ton: Filtration time (minutes)
None _____ 13.3
0.1 _____ 5.4
0.03 _____ 4.0
0.008 _____ 7.5
0.003 _____ 9.5
0.0015 _____ 11.9
0.0008 _____ 11.9

A sample of ore generally similar to the above was given the same leach treatment (pH=1.2) and was used in a similar series of filtration tests. The results of these tests follow:

Polyacrylamide, lb./ton: Filtration time (minutes)
None (control) _____ 10.9
0.06 _____ 4.4
0.099 _____ 3.8
0.26 _____ 2.0
0.99 _____ 3.6

Example 22

Pulps (pH=1.0–1.5) resulting from the sulfuric acid leaching of gold ores generally similar to those described in Example 14 were used in filtration tests. 1000 parts by volume samples containing 600 parts by weight of solids were treated in separate tests with polyacrylamide, acrylamide-acrylic acid copolymers, acid-treated polyacrylonitrile, the sodium salt of hydrolyzed polyacrylonitrile, glue, guar gum and locust bean gum. The treated pulps were filtered on an 8-inch Buchner funnel and the time of filtration noted. In certain of the tests the filter cake was removed from the funnel, repulped to a volume of 1000 parts then refiltered. The time required to filter the wash liquors was noted. The results of tests conducted on several ores taken from several different mining properties are given in the following table. Control tests (no treatment) were also conducted for purposes of comparison.

| Treatment | Time, Minutes | |
|---|---|---|
| | First Filtration | Wash Filtration |
| Pulp A: | | |
| None—Control | 13 2 | |
| 0.25 lb./ton Glue | 6.2 | |
| 0.25 lb./ton Sodium Salt of Hydrolyzed Polyacrylonitrile | 9.0 | |
| 0.1 lb./ton Polyacrylamide | 5.2 | |
| Pulp B: | | |
| None—Control test | 20.1 | |
| 0.25 lb./ton Glue | 11.3 | |
| 0.25 lb./ton Sodium Salt of Hydrolyzed Polyacrylonitrile | 16.8 | |
| 0.1 lb./ton Polyacrylamide | 12.4 | |
| 0.25 lb./ton Polyacrylamide | 9.9 | |
| Pulp C: | | |
| None—Control test | 10.5 | |
| 0.1 lb./ton Polyacrylamide | 4.8 | |
| 0.1 lb./ton Copolymer of Acrylamide-Acrylic Acid | 5.3 | |
| Pulp D: | | |
| None—Control test | 13.5 | |
| 0.1 lb./ton Acid-treated Polyacrylonitrile [1] | 7.8 | |
| 0.1 lb./ton Copolymer of Acrylamide-Acrylic Acid | 7.1 | |
| Pulp E: | | |
| None—Control test | 16.5 | 15.4 |
| 0.1 lb./ton Polyacrylamide (High Molecular Weight) | 5.5 | 5.1 |
| 0.1 lb./ton Polyacrylamide (Medium Molecular Weight) | 8.2 | 8.5 |
| 0.1 lb./ton Polyacrylamide (Low Molecular Weight) | 8.8 | 7.8 |
| 0.1 lb./ton Locust Bean Gum | 11.0 | 13.0 |
| 0.1 lb./ton Guar Gum | 8.3 | 12.2 |
| 0.1 lb./ton Glue | 10.8 | 11.1 |
| Pulp F: | | |
| None—Control test | 15.9 | 15.7 |
| 0.1 lb./ton Polyacrylamide (Low Molecular Weight) | 8.8 | 7.3 |
| 0.1 lb./ton Polyacrylamide (Medium Molecular Weight) | 5.8 | 5.3 |
| 0.1 lb./ton Polyacrylamide (High Molecular Weight) | 7.0 | 7.5 |
| 0.1 lb./ton Polyacrylamide (Medium Molecular Weight) | 6.0 | [2] 4.5 |

[1] Heated in concentrated sulfuric acid.
[2] An additional 0.1 lb./ton Polyacrylamide (Medium Molecular Weight) added to wash liquors prior to filtration in this test.

In all tests except the last the polymer was added only to the acid-leach liquors prior to filtration. The use of the polymer improved filtration rates markedly in the first filtration step and also in the wash filtration. Further improvement in the rate of wash filtration was achieved in the last test by adding an additional small amount of polymer to the wash liquors prior to the filtration of these liquors.

Also it will be noted that polyacrylamide, the polyacrylamide product obtained by acid-treatment of polyacrylonitrile, and the copolymers of acrylamide-acrylic acid were superior to known filter aids such as glue and gums and also to the sodium salt of hydrolyzed polyacrylonitrile at this low pH.

Example 23

Polyacrylonitriles of varying calculated molecular weights were treated by heating in concentrated sulfuric acid. 1% concentrations of polyacrylonitrile were heated at 70–80° C. until complete dissolution occurred and in a series of filtration tests were added to suspensions of acid leached ore generally similar to those described in Example 11. Additions equivalent to 0.1 lb./ton based on the original polyacrylonitrile were used on 1000 parts by volume samples of suspensions containing 600 parts by weight of tailings. The filtration times were as follows:

| Calculated molecular weight of polyacrylonitrile used: | Filtration time, minutes |
|---|---|
| None used (Control test) | 11.1 |
| 46,000 | 7.3 |
| 86,000 | 7.2 |
| 170,000 | 7.8 |
| 380,000 | 7.3 |
| 820,000 | 7.2 |

The above data show marked increases in filtration rates with the acid-treated polyacrylonitrile over the control.

Example 24

Several polymer products prepared by controlled alkali hydrolysis of polyacrylamide were used as sodium salts in filtration tests on the acid-leached ore described in Example 14. Following the acid leaching operation, amounts equivalent to 0.1 lb./ton of each polymer in separate tests was agitated with the acidic pulp (600 parts by weight of tailings in a volume of 1000 parts; pH=1.0–1.5), which was then filtered. Following this filtration operation, the filter cake was removed from the filter and the solids washed by resuspending in water (total pulp volume of 1000 parts) and again filtering. The time required in these filtration steps was noted. The results of these tests are summarized in the following table which also contains data on a control test without polymers:

| Test No. | Monomeric Units | | Time, Minutes | |
|---|---|---|---|---|
| | Percent Acrylamide | Percent Acrylic Acid | First Filtration | Wash Filtration |
| 1 [1] | | | 10.5 | 6.3 |
| 2 | 94 | 6 | 5.3 | 2.8 |
| 3 | 85 | 15 | 4.4 | 2.5 |
| 4 | 83 | 17 | 4.9 | 2.2 |
| 5 | 78 | 22 | 5.3 | 2.7 |
| 6 | 70 | 30 | 4.4 | 2.6 |
| 7 | 62 | 38 | 5.5 | 2.6 |
| 8 | 49 | 51 | 8.5 | 4.8 |

[1] Control Test; no copolymer used.

The filtration rates in both filtering operations were improved markedly over those of the control test. The improvements effected by the use of the polymers in the first filtration are carried over into the washing filtration operation without requiring the use of additional quantities of polymer.

Example 25

Filtration tests were conducted on samples of tailings similar to those described in Example 18. 1000 parts by volume samples containing 600 parts by weight solids were used. The pH of the pulp was 1.5. The samples were filtered and then the filter cakes washed by repulping and refiltration as described in Example 20. Polyacrylamide, copolymers of acrylamide-acrylic acid; polyacrylamide products produced by acid-treatment of polyacrylonitrile in sulfuric acid, and locust bean gum were used in this series of tests, which also contained a control test without added chemicals. Test results follow:

| Materials Added | Time, Minutes | |
|---|---|---|
| | First Filtration | Wash Filtration |
| None | 14.5 | 12.1 |
| 0.1 lb./ton Polyacrylamide (Low Mol. Weight) | 4.9 | 6.5 |
| 0.1 lb./ton Polyacrylamide (Medium Mol. Wgt.) | 4.8 | 5.9 |
| 0.1 lb./ton Polyacrylamide (High Mol. Weight) | 3.5 | 4.3 |
| 0.1 lb./ton Copolymer of Acrylamide-Acrylic Acid | 5.4 | 6.0 |
| 0.1 lb./ton Acid-hydrolyzed Polyacrylonitrile | 5.8 | 6.3 |
| 0.1 lb./ton Locust Bean Gum | 9.3 | 11.8 |

All tests with polyacrylamide and related products showed improved filtration rates in both operations as compared to those of the control test and test with the locust bean gum.

Example 26

A refractory gold ore was made amenable to cyanidation by treating under pressure with sulfuric acid in an autoclave. The resulting pulp was highly acidic due to the action of high pressure oxygen on the sulfide portions of the ore and was difficult to thicken and filter. Polyacrylamide equivalent to 0.05 lb./ton was found to thicken the pulp readily and caused rapid flocculation of the slime portions. In 30 minutes effective thickening had taken place in this test whereas the fines remained in suspension for several hours in an untreated sample.

After this treatment the pulp was filtered under 15 lb. pressure and it required 21 minutes for complete filtration as compared to 47 minutes in the control test.

Example 27

The effectiveness of polyacrylamide as an aid to filtering ore pulps containing various acids was determined by taking 600 parts by weight samples of a gold ore generally similar to that described in Example 14, ground to about 200 mesh, and agitating for 16 hours with amounts equivalent to 50 lb./ton of hydrochloric, nitric and phosphoric acids. The volume of the pulp was 1000 parts. Following this leaching operation, polyacrylamide equivalent to 0.1 lb./ton was added to the pulp which was agitated for 4 minutes and filtered. The filter cake was washed by repulping in water to a volume of 1000 parts and filtered. The time required in each filtration operation was noted. Control tests (no polyacrylamide used) were also conducted with each of the three acids. These tests are summarized in the following table.

| Acid Used | Polyacrylamide Used | Time, Minutes | |
|---|---|---|---|
| | | First Filtration | Wash Filtration |
| HCl | None | 13.4 | 10.8 |
| HCl | 0.1 lb./ton | 7.8 | 6.0 |
| HNO$_3$ | None | 10.7 | 6.5 |
| HNO$_3$ | 0.1 lb./ton | 6.1 | 6.1 |
| H$_3$PO$_4$ | None | 6.8 | 6.8 |
| H$_3$PO$_4$ | 0.1 lb./ton | 5.8 | 5.7 |

Example 28

Filtration tests were conducted on various acidic suspensions treated with polyacrylamide and related materials. The following table summarizes the results of the tests and also includes data on untreated suspensions for purposes of comparison.

| Suspension Tested | | | Polymer Used | Filtration Time, Mins. | |
|---|---|---|---|---|---|
| Type | pH | Volume (cc.) | | Control (no treat.) | After Treatment |
| Suspension (about 50% solids) of acid treated gold ore | 3.0 | 1,000 | 0.1 lb./ton Copolymer of Acrylamide-Acrylic Acid. | 15.5 | 6.8 |
| Acid-leached Vanadium Ore (20% solids) | 1.5 | 1,000 | 0.1 lb./ton Polyacrylamide | 12.3 | 5.1 |
| Anthracite coal fines (20% solids) | 3.0 | 1,000 | do | 7.3 | 3.5 |
| Bituminous coal fines (20% solids) | 3.1 | 1,000 | do | 8.4 | 4.7 |
| Iron oxide fines (15% solids) | 2.9 | 1,000 | 0.06 lb./ton Acid-treated Polyacrylonitrile. | 16.3 | 10.6 |
| Fine lead sulfide concentrate | 3.9 | 1,000 | 0.05 lb./ton Polyacrylamide | 12.4 | 7.0 |
| Zinc refining sludge | 2.5 | 1,000 | do | 22.3 | 14.1 |

Example 29

The highly acid titanium bearing liquors obtained by dissolving in water the cake formed by digesting finely-divided titaniferous slag with strong H$_2$SO$_4$, was treated with 0.1 lb./ton of polyacrylamide in order to settle out finely-divided suspended mineral matter. The major quantities of this suspended matter settled readily, after which the liquor was filtered and hydrolyzed in the presence of an additional 0.07 lb./ton polyacrylamide. The precipitate of titania hydrolysate thus formed was filtered and washed. The addition of polyacrylamide in this latter operation improved the filtration characteristics of the precipitate giving it a more open texture.

Similar results were obtained by the addition of polyacrylamide to the acidic titanium sulfate liquors obtained in the same manner from cakes formed by digestion of ilmenite ore concentrates with strong sulfuric acid.

Example 30

A talcose sulfide ore was ground to about minus 65 mesh and treated with 0.05 lb./ton polyacrylamide and allowed to settle. The pH of the pulp (388 grams of solids per liter) was 8.3. The results of settling tests were as follows:

| Time, Minutes | Volume (cc.) of Settled Solids | |
|---|---|---|
| | Control Test | Polyacrylamide |
| Start | 1,000 | 1,000 |
| 10 | 978 | 968 |
| 20 | 950 | 918 |
| 30 | 923 | 870 |
| 40 | 898 | 828 |
| 50 | 872 | 780 |
| 60 | 845 | 730 |
| 90 | 770 | 625 |
| 120 | 684 | 600 |

Example 31

A 1-liter sample of a weathered cyanidation tailing (20% solids; pH=8.5) was treated with polyacrylamide. Settling rates are given in the following table:

| Time, Minutes | Control Test | Polyacrylamide, lb./ton | | | | |
|---|---|---|---|---|---|---|
| | | 0.005 | 0.01 | 0.025 | 0.05 | 0.1 |
| | | Volume (cc.) of Settled Solids | | | | |
| Start | 1,000 | 1,000 | 1,000 | 1,000 | 1,000 | 1,000 |
| 10 | 892 | 520 | 520 | 515 | 492 | 490 |
| 20 | 808 | 408 | 400 | 405 | 400 | 398 |
| 30 | 718 | 355 | 352 | 365 | 365 | 355 |
| 45 | 575 | 330 | 330 | 335 | 328 | 318 |
| 60 | 440 | 315 | 315 | 318 | 305 | 298 |
| 75 | 355 | 305 | 302 | 305 | 292 | 285 |

Example 32

A weathered cyanidation tailing (about 60% minus 200 mesh), containing pyrite, quartz and chlorite was treated with 0.05 lb./ton of an 85:15 copolymer of acrylamide and acrylic acid and allowed to settle. The data obtained are shown in the following table. The pulp contained 400 grams of solids per liter. The pH was 8.0.

| Time, Minutes | Volume (cc.) of Settled Solids | |
|---|---|---|
| | Control Test | Copolymer |
| Start | 1,000 | 1,000 |
| 10 | 960 | 860 |
| 20 | 928 | 740 |
| 30 | 896 | 618 |
| 40 | 862 | 562 |
| 50 | 831 | 539 |
| 60 | 798 | 521 |
| 100 | 652 | 478 |
| 120 | 580 | 465 |

Example 33

A manganese ore containing mainly rhodocrosite was ground to minus 65 mesh and treated with polyacrylamide in amounts of 0.1 lb./ton and then allowed to settle. The pulp (pH=8.0) contained 200 grams suspended solids per liter. Settling rates follow:

| Time, Minutes | Volume (cc.) of Settled Solids | |
|---|---|---|
| | Control Test | Polyacrylamide |
| Start | 1,000 | 1,000 |
| 10 | 930 | 880 |
| 20 | 870 | 778 |
| 30 | 808 | 680 |
| 40 | 752 | 575 |
| 50 | 700 | 510 |
| 60 | 640 | 498 |
| 90 | 510 | 460 |
| 120 | 482 | 440 |

Example 34

The effluent (10% solids) from a bituminous coal plant (pH=9.0) was treated with polyacrylamide (0.1 lb./ton) and allowed to settle as follows:

| Time, Minutes | Volume (cc.) of Settled Solids | |
|---|---|---|
| | Control Test | Polyacrylamide |
| Start | | 1,000 |
| 10 | | 1,000 |
| 20 | | 630 |
| 30 | No settling noted in the 120-minute test period | 550 |
| 40 | | 480 |
| 50 | | 418 |
| 60 | | 390 |
| 90 | | 353 |
| 120 | | 348 |

Example 35

A second sample of effluent (10% solids) from a bituminous coal plant was treated with polyacrylamide (0.1 lb./ton) and allowed to settle. The pH of the suspension was 7.4. Settling rates follow:

| Time, Minutes | Volume (cc.) of Settled Solids | |
|---|---|---|
| | Control Test | Polyacrylamide |
| Start | 1,000 | 1,000 |
| 10 | 960 | 900 |
| 20 | 920 | 815 |
| 30 | 872 | 740 |
| 40 | 840 | 660 |
| 50 | 795 | 575 |
| 60 | 755 | 510 |
| 90 | 632 | 380 |
| 120 | 505 | 370 |

Example 36

The ore materials remaining as residue after leaching operations at 25° and 95° C. with 10% sodium carbonate on a uranium ore were treated with 0.1 lb./ton polyacrylamide and allowed to settle. The pH of these suspensions was 10.8. Settling was as follows:

| Time, Minutes | 25° C. | | 95° C. | |
|---|---|---|---|---|
| | Volume (cc.) of Settled Solids | | | |
| | Control | Polyacrylamide | Control | Polyacrylamide |
| Start | 1,000 | 1,000 | 1,000 | 1,000 |
| 5 | 915 | 825 | 880 | 840 |
| 10 | 800 | 685 | 740 | 700 |
| 15 | 725 | 560 | 632 | 582 |
| 20 | 662 | 500 | 520 | 480 |
| 25 | 615 | 465 | 430 | 385 |
| 30 | 560 | 405 | 360 | 320 |

Example 37

A sample of finely divided elemental sulfur ore (about 15% solids; pH=1.7) was treated with 0.1 lb./ton polyacrylamide and allowed to settle as follows:

| Time, Minutes | Volume (cc.) of Settled Portions | |
|---|---|---|
| | Control Test | Polyacrylamide |
| Start | 500 | 500 |
| 5 | 470 | 435 |
| 10 | 440 | 375 |
| 15 | 410 | 322 |
| 20 | 380 | 275 |
| 25 | 353 | 250 |
| 30 | 325 | 220 |
| 40 | 273 | 198 |

Example 38

A sulfide lead concentrate (40% solids; pH=6.5) was found to settle readily in about 20 minutes, but the resulting overflow liquid was dirty, thus representing a loss in lead values. The settling rate was improved by the use of 0.02 lb./ton polyacrylamide, and the resulting overflow was clear.

| Time, Minutes | Volume (cc.) of Settled Solids | |
|---|---|---|
| | Control Test | Polyacrylamide |
| Start | 500 | 500 |
| 5 | 350 | 265 |
| 10 | 238 | 170 |
| 15 | 182 | 155 |
| 20 | 145 | 145 |
| Overflow | Dirty | Clear |

A second lead concentrate was treated similarly with 0.05 lb./ton of a copolymer of acrylamide-acrylic acid. The sample treated contained 630 grams per liter. Settling was complete in 25 minutes with a clear overflow.

Example 39

A slimy silver-gold ore was ground and subjected to cyanidation to dissolve the precious metal values. Following this treatment, the pulp was sent to a thickener which removed the bulk of the suspended solids. Due to the slimy nature of the ore, the resulting thickener overflow contained about 6% fine solids which required filtering before precipitation of the values. The pregnant solution even after filtration was cloudy, which caused contamination of the gold-silver precipitate. This thickener overflow (pH=11.5) was treated with 0.02 lb./ton polyacrylamide and allowed to settle. Comparative settling operations with and without this treatment are summarized in the following table.

| Time, Minutes | Volume (cc.) of Settled Portions | |
|---|---|---|
| | With Treatment | Without Treatment |
| Start | 1,000 | 1,000 |
| 5 | 680 | 885 |
| 10 | 460 | 770 |
| 15 | 365 | 668 |
| 20 | 338 | 570 |
| 25 | 320 | 500 |
| 30 | 305 | 432 |
| Overflow | Cloudy | Clear |

The supernatant pregnant solution was decanted from the settled slimes which were than washed by repulping to their original volume, followed by resettling as summarized in the following table. No additional polyacrylamide was added in this washing operation.

| Time, Minutes | Volume (cc.) of Settled Portions | |
|---|---|---|
| | With Treatment | Without Treatment |
| Start | 1,000 | 1,000 |
| 5 | 680 | 875 |
| 10 | 455 | 740 |
| 20 | 340 | 540 |
| 30 | 310 | 388 |

Settling was continued until 700 cc. of overflow could be removed by decantation. The solids were then filtered and washed with 200 cc. of water. Filtration and washing times were as follows:

| | Treated | Untreated |
|---|---|---|
| Filtration time, minutes | 5.8 | 10.6 |
| Washing time, minutes | 7.9 | 12.9 |

The polyacrylamide added in the original settling operation continued to be effective in the second settling step and in the final filtration operation.

Example 40

A sample of cyanidation tailings (60% solids; pH of about 9.0) was treated with 0.1 lb./ton polyacrylamide and filtered. The filtration time was 7.3 minutes. The filter cake was removed, repulped at 60% solids and refiltered; the filtration time in this washing filtration step was 5.2 minutes. These filtration times are to be compared to 13.3 and 7.8 minutes, respectively, for similar operations on a control sample (no polyacrylamide).

A second sample of cyanidation tailings was similarly treated. The pH of this pulp (600 grams per liter) was 7.6. The filtration times for a sample treated with 0.1 lb./ton polyacrylamide were 4.75 minutes (first filtration) and 2.9 minutes (wash filtration) as compared to 7.5 and 4.8 minutes for similar operations in a control test (no polyacrylamide).

Example 41

This example illustrates the flocculation of lime salts which frequently precipitate out in cyanide solutions used in the dissolution of gold and silver from ores. The deposition of such lime salts interferes with filtering and clarifying pregnant cyanide solutions prior to the precipitation and recovery of the gold and silver.

Two hundred fifty (250) parts of a clear solution containing 0.02% NaCN equivalent, 0.04% $CaSO_4$ and 0.04% CaO were added to 250 parts of a solution containing 0.05% sodium bicarbonate in the presence of 10 parts per million of the sodium salt of hydrolyzed polyacrylonitrile and polyacrylamide (high, medium and low molecular weight) in a series of separate tests. A control test without polymer treatment was also conducted.

Precipitation of lime salts took place immediately and the resulting suspensions were allowed to stand for 30 minutes. With 10 p.p.m. sodium salt of hydrolyzed polyacrylonitrile immediate flocculation was apparent and settling was complete in 10 minutes. Similarly with the three polyacrylamides settling was complete in 20 minutes. In the control test virtually no settling took place in the 30-minute test period.

The above suspension was filtered. The polymer-treated samples showed 65–100% increase in filtration rates over the control test.

Example 42

A 1000 cc. sample of a uranium precipitate containing about 1% solids in suspension was treated as follows:

Test A: Control test; no treatment.
Test B: 0.002 parts by weight of the sodium salt of hydrolyzed polyacrylonitrile per 1000 volume parts of suspension.
Test C: 0.002 parts by weight of polyacrylamide per 1000 volume parts of suspension.

The suspensions were then allowed to settle with the following results:

Test A: Settling incomplete in 30 minutes with cloudy supernatant liquid.
Test B: Settling complete in 15 minutes with clear supernatant liquid.
Test C: Settling complete in 10 minutes with clear supernatant liquid.

Example 43

Calcium sulfate was precipitated by combining 200 cc. of 1.0 molal calcium chloride and 200 cc. of 1.0 molal sodium sulfate. The resulting precipitate in suspension was treated in separate tests with 0.0025 gram of the sodium salt of hydrolyzed polyacrylonitrile, polyacrylamide, and an 85:15 copolymer of acrylamide and acrylic acid and allowed to settle. A control test without treatment was also conducted. Results of these tests follow:

| Time, Minutes | Volume (cc.) of Settled Solids | | | |
|---|---|---|---|---|
| | Control | Sodium Salt of Hydrolized Polyacrylonitrile | Polyacrylamide | Copolymer |
| 5 | 347 | 326 | 318 | 285 |
| 10 | 307 | 280 | 270 | 194 |
| 15 | 248 | 232 | 212 | 152 |
| 20 | 207 | 192 | 192 | 145 |

Barium sulfate was similarly precipitated by combining 1.0 molal solutions of barium chloride and sodium sulfate and in separate tests 0.005 gram of the sodium salt of hydrolyzed polyacrylonitrile and a copolymer of acrylamide and acrylic acid were used as settling aids. Settling rates were as follows:

| Time, Minutes | Volume (cc.) of Settled Solids | | |
|---|---|---|---|
| | Control | Sodium Salt of Hydrolyzed Polyacrylonitrile | Copolymer |
| 5 | 374 | 362 | 365 |
| 10 | 355 | 323 | 338 |
| 15 | 332 | 290 | 306 |
| 20 | 308 | 280 | 278 |
| 25 | 288 | 275 | 260 |
| 30 | 280 | 268 | 252 |

Precipitates of calcium oxalate were prepared similarly by combining solutions of calcium chloride with oxalic acid. Settling with 0.005 gram of polyacrylamide was as follows:

| Time, Minutes | Volume (cc.) of Settled Solids | |
|---|---|---|
| | Control | Polyacrylamide |
| 5 | 365 | 363 |
| 10 | 350 | 330 |
| 15 | 338 | 302 |
| 20 | 324 | 285 |
| 25 | 310 | 270 |
| 30 | 298 | 258 |

A fine precipitate of zinc sulfide was prepared by saturating a 0.25% solution of zinc chloride with hydrogen sulfide. Samples of 200 cc. of this suspension were treated with 0.005 gram in separate tests of the sodium salt of polyacrylonitrile, polyacrylamide, and a copolymer of acrylamide-acrylic acid. With polyacrylamide and the sodium salt of hydrolyzed polyacrylonitrile settling was complete in 15 minutes, with the copolymer in 20 minutes, and in 30 minutes in a control test (no treatment).

Example 44

An acidic solution (1000 cc.) containing about 3% iron salts (pH=1) was neutralized with ammonia to pH=3.5, treated with 0.0015 gram of polyacrylamide and allowed to settle. Settling was complete in 30 minutes with clear supernatant liquid. A similar test without polyacrylamide required 65 minutes for complete settling.

An acidic solution of about 2% ferrous iron salts was similarly neutralized to a pH of 6.3 and treated similarly with polyacrylamide. Settling was complete in 35 minutes as compared to 60 minutes for a control test without polyacrylamide.

Example 45

An acidic mine water of pH of 3.0 and containing soluble iron and sulfate was neutralized with lime. A precipitate of lime and iron compounds resulted which was difficult to settle and to filter. Flocculation and settling were incomplete at the end of 30 minutes. However, in the presence of 0.002 gram of polyacrylamide per liter settling was complete in 15 minutes.

Example 46

A variety of ore and mineral suspensions were treated with polymers and allowed to settle. Results of these treatments were as follows:

| Type of Suspension | Polymer | | Test Results Obtained |
|---|---|---|---|
| | Type | Lb./ton | |
| Manganese Ore | Sodium Salt of Hydrolyzed Polyacrylonitrile. | 0.02 | Overflow reduced from 2% solids to less than 0.1% solids. |
| Tailings from Pyrite Flotation | do | 0.03 | Overflow reduced from 1.5% solids to 0.05% solids. |
| Slime-containing gold bearing cyanide solution. | Polyacrylamide | 0.02 | 100% increase in settling rate. |
| Slimy pyritic high quartz gold ore | Acrylamide-Acrylic Acid Copolymer (85:15). | 0.05 | Complete settling in 40 minutes as compared to 75 in test without polymer. |
| Cyanide pulp from counter-current decantation plant. | Polyacrylamide | 0.02 | 200% increase in settling rate; clear overflow. |
| Effluent from Anthracite Coal Plant | Sodium Salt of Hydrolyzed Polyacrylonitrile. | 0.015 | Thickener overflow reduced from 0.18% solids to 0.004% solids. |
| Slime portions of sulfide flotation tailings prior to cyanidation. | do | 0.04 | 300% increase in settling rate; cyanidation of slimes made possible. |
| Weathered quartz-pyrite ore | Polyacrylamide | 0.05 | 125% increase in settling rate. |
| Zinc Sulfide Flotation Concentrate | Sodium Salt of Hydrolyzed Polyacrylonitrile. | 0.1 | Settling rate was doubled; clear effluent. |
| Tungsten Ore | do | 0.075 | 133% improvement in settling rate. |
| Tungsten Ore Flotation Tailings pH=9.8 | do | 0.1 | Clear effluent and 75% increase in settling. |

We claim.

1. A process of settling ore pulps and mineral suspensions containing finely-divided, predominantly non-argillaceous minerals which comprises treating said ore pulps and mineral suspensions having a pulp density of not more than about 50% solids with a water-soluble polymer of a compound represented by the formula $$C=C-R$$

wherein R is selected from the group consisting of nitrile, amide, and carboxyl radicals, COOM wherein M is a lower alkyl radical of from 1 to 4 carbon atoms, and water-soluble saltes thereof, said polymer being employed in an amount ranging from about 0.005 lb./ton to about 10 lb./ton by weight of suspended mineral solids, said polymer having an average molecular weight of at least 10,000, and allowing the finely-divided mineral solids to settle.

2. A process according to claim 1 in which the polymer is a polyacrylamide.

3. A process according to claim 1 in which the polymer is an acrylic acid-acrylamide copolymer.

4. A process according to claim 1 in which the polymer is an alkali hydrolyzed polyacrylamide.

5. A process according to claim 1 in which the polymer is an acid-hydrolyzed polyacrylonitrile.

6. A process of improving the filtration characteristics of ore pulps and mineral suspensions containing finely-divided, predominantly non-argillaceous minerals which comprises treating said ore pulps and mineral suspensions having a pulp density of not more than about 50% solids with a water-soluble polymer of a compound represented by the formula $$C=C-R$$

wherein R is selected from the group consisting of nitrile, amide and carboxyl radicals, COOM wherein M is a lower alkyl radical of from 1 to 4 carbon atoms, and water-soluble salts thereof, said polymer being employed in an amount ranging from about 0.005 lb./ton to about 5 lb./ton by weight of suspended mineral solids, said polymer having an average molecular weight of at least 10,000, and filtering the treated ore pulps and mineral suspensions whereby improved filtration rates are obtained.

7. A process of settling acidic ore pulps and acidic mineral suspensions containing finely-divided, predominantly non-argillaceous minerals which comprises treating said ore pulps and mineral suspensions having a pulp density of not more than about 50% solids with an acrylic polymer having at least 50% of the monomer units attached to amide groups, said polymer being employed in an amount ranging from about 0.005 lb./ton to about 10 lb./ton by weight of suspended mineral solids, said polymer having an average molecular weight of at least 10,000, and allowing the finely-divided mineral solids to settle.

8. A process according to claim 7 in which the polymer is a polyacrylamide.

9. A process according to claim 7 in which the polymer is an acrylic acid-acrylamide copolymer.

10. A process according to claim 7 in which the polymer is an alkali-hydrolyzed polyacrylamide.

11. A process according to claim 7 in which the polymer is an acid-hydrolyzed polyacrylonitrile.

12. A process of settling acidic ore pulps and acidic mineral suspensions containing finely-divided, predominantly non-argillaceous minerals produced by the acid leaching of mineral values which comprises treating said ore pulps and mineral suspensions having a pulp density of not more than about 50% solids with an acrylic polymer having at least 50% of the monomer units attached to amide groups, said polymer being employed in an amount ranging from about 0.005 lb./ton to about 10 lbs./ton by weight of suspended mineral solids, said polymer having an average molecular weight of at least 10,000, and allowing the finely-divided mineral solids to settle.

13. A process according to claim 12 in which the acidic pulp is produced by the acid-leaching of a sulfide ore.

14. A process according to claim 12 in which the acidic pulp is produced by the acid-leaching of a copper ore.

15. A process of settling acidic ore pulps and acidic mineral suspensions containing finely-divided, predominantly non-argillaceous minerals produced by the acid leaching of a uranium bearing material which comprises treating said ore pulps and mineral suspensions having a pulp density of not more than about 50% solids with an acrylic polymer having at least 50% of the monomer units attached to amide groups, said polymer being employed in an amount ranging from about 0.005 lb./ton to about 10 lb./ton by weight of suspended mineral solids, said polymer having an average molecular weight of at least 10,000, and allowing the finely-divided mineral solids to settle.

16. A process of settling ore pulps and mineral suspensions containing finely-divided, predominantly non-argillaceous minerals which comprises treating said ore pulps and mineral suspensions having a pulp density of not more than about 50% solids with a sodium salt of a water-soluble, hydrolyzed polyacrylonitrile polymer, said polymer being employed in an amount ranging from about 0.005 lb./ton to about 10 lb./ton by weight of suspended mineral solids, said polymer having an average molecular weight of at least 10,000, and allowing the finely-divided mineral solids to settle.

17. A method of separating finely-divided, predominantly non-argillaceous phosphate rock solids which normally remain suspended in water from an aqueous suspension thereof which comprises treating said suspension with from about 0.005 lb./ton to about 10 lb./ton by weight of said suspended solids of a synthetic polymer in a water-dispersible state having an average molecular weight of at least 10,000, and being a substantially non-cross linked polymer of a compound containing the group

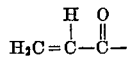

18. A method of separating finely-divided, predominantly non-argillaceous coal which normally remains suspended in water from an aqueous suspension thereof which comprises treating said suspension with from about 0.005 lb./ton to about 10 lb./ton by weight of said suspended solids of a synthetic polymer in a water-dispersible state having an average molecular weight of at least 10,000, and being a substantially non-cross linked polymer of a compound containing the group

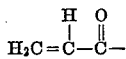

19. A process of improving the filtration characteristics of acidic ore pulps and acidic mineral suspensions containing finely-divided, predominantly non-argillaceous minerals which comprises treating said ore pulps and mineral suspensions having a pulp density of not more than about 50% solids with an acrylic polymer having at least 50% of the monomer units attached to amide groups, said polymer being employed in an amount ranging from about 0.005 lb./ton to about 5 lb./ton by weight of suspended mineral solids, said polymer having an average molecular weight of at least 10,000, and filtering the treated ore pulps and mineral suspensions whereby improved filtration rates are obtained.

20. A process of settling chemical precipitates from aqueous suspensions thereof which comprises treating said suspensions with a water-soluble polymer of a compound represented by the formula

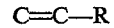

wherein R is selected from the group consisting of nitrile, amide, and carboxyl radicals, COOM wherein M is a lower alkyl radical of from 1 to 4 carbon atoms, and water-soluble salts thereof, said polymer being employed in an amount ranging from about 0.005 lb./ton to about 10 lb./ton by weight of suspended solids, said polymer having an average molecular weight of at least 10,000, and allowing the chemical precipitates to settle.

21. A process according to claim 20 in which the chemical precipitates are uranium precipitates.

22. A process of improving the filtration characteristics of aqueous suspensions of chemical precipitates which comprises treating said suspensions with a water-soluble polymer of a compound represented by the formula

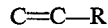

wherein R is selected from the group consisting of nitrile, amide, and carboxyl radicals, COOM wherein M is a lower alkyl radical of from 1 to 4 carbon atoms, and water-soluble salts thereof, said polymer being employed in an amount ranging from about 0.005 lb./ton to about 10 lb./ton by weight of suspended solids, said polymer having an average molecular weight of at least 10,000, and filtering the treated suspensions whereby improved filtration rates are obtained.

References Cited

UNITED STATES PATENTS

| | | | |
|---|---|---|---|
| 2,149,748 | 3/1939 | Samuel | 210—43 |
| 2,419,930 | 4/1947 | Wilson | 210—54 |
| 2,469,696 | 5/1949 | Minsk et al. | 260—89.7 |
| 2,563,897 | 8/1951 | Wilson et al. | 162—166 |
| 2,601,597 | 6/1952 | Daniel et al. | 162—164 |
| 2,601,598 | 6/1952 | Daniel et al. | 162—167 |
| 2,625,529 | 1/1953 | Hedrick et al. | 210—54 XR |
| 2,685,369 | 8/1954 | Crossley | 210—49 |

FOREIGN PATENTS

| | | |
|---|---|---|
| 154,799 | 1/1954 | Australia. |
| 475,671 | 11/1937 | Great Britain. |
| 555,089 | 8/1943 | Great Britain. |

OTHER REFERENCES

Schweitzer "Rubber Chemistry and Technology," vol. 13 (1940), pp. 408–414.

Soil Science, vol. 73, No. 6, June 1952, pp. 419, 428, 455, and 485–92.

Fourth International Congr. of Soil Sci., July 24–Aug. 1, 1950, Transactions, vol. 1, pp. 198–201.

MORRIS O. WOLK, *Primary Examiner.*

U.S. Cl. X.R.

210—65, 51; 23—313, 66, 134; 75—3, 1; 209—5; 252—303, 320; 23—135, 183, 50

UNITED STATES PATENT OFFICE
CERTIFICATE OF CORRECTION

Patent No. 3,418,237　　　　　　　　　　　　　　　December 24, 1968

Robert B. Booth et al.

It is certified that error appears in the above identified patent and that said Letters Patent are hereby corrected as shown below:

Column 2, line 60, "hydrolized" should read -- hydrolyzed --. Column 4, line 33, "exces" should read -- excess --. Column 12, line 52, "of" should read -- to --; line 72, "was" should read -- were --. Columns 15 and 16, in the table, fourth column, line 5 thereof, "olyacrylamide" should read -- Polyacrylamide --. Column 18, line 57, "Example 20" should read -- Example 22 --. Columns 19 and 20, in the table, fourth column, line 9 thereof, "do" should read -- 0.15 lb./ton Polyacrylamide --. Column 24, in the first table, sub-heading to the third column, line 2 thereof, "Hydrolized" should read -- Hydrolyzed --. Column 25, line 37, "saltes" should read -- salts --. Column 28, list of References Cited, add the following references:

UNITED STATES PATENTS

| Number | Date | Name | Class |
|---|---|---|---|
| 1,585,755 | 5/1926 | Borcherdt | 209/49 |
| 1,976,679 | 10/1934 | Fikentscher et al. | 8/6 |
| 2,138,073 | 11/1938 | Schweitzer | 18/50 |
| 2,236,545 | 4/1941 | Maxwell et al. | 260/231 |
| 2,236,930 | 4/1941 | Uytenbogaart | 210/2 |
| 2,266,954 | 12/1941 | Bonnet et al. | 210/42.5 |
| 2,315,675 | 4/1943 | Trommsdorff | 92/21 |
| 2,317,804 | 4/1943 | Reppe | 260/313 |
| 2,326,078 | 8/1943 | Trommsdorff et al. | 260/86.1 |
| 2,327,302 | 8/1943 | Dittmar | 252/132 |
| 2,347,576 | 4/1944 | Ogilby | 260/821 |
| 2,351,259 | 6/1944 | Fuetterer | 210/23 |
| 2,394,083 | 2/1946 | Lintz | 210/23 |
| 2,423,766 | 7/1947 | Freeman | 260/93 |
| 2,446,107 | 7/1948 | Rumbold | 260/29.7 |
| 2,533,166 | 12/1950 | Jones | 260/89.7 |
| 2,552,775 | 5/1951 | Fischer et al. | 252/8.5 |
| 2,564,726 | 8/1951 | Saner | 260/88.3 |
| 2,616,818 | 11/1952 | Azorlosa | 117/155 |
| 2,626,213 | 1/1953 | Novak | 92/3 |
| 2,661,309 | 12/1953 | Azorlosa | 117/62 |
| 2,687,374 | 8/1954 | Mowry et al. | 210/2 |
| 2,718,497 | 9/1955 | Oldham et al. | 252/8.5 |
| 2,728,725 | 12/1955 | Gloor | 210/23 |
| 2,729,557 | 1/1956 | Booth et al. | 75/105 |
| 2,729,560 | 1/1956 | House et al. | 92/3 |
| 2,740,522 | 4/1956 | Aimone et al. | 209/166 |
| 2,775,557 | 12/1956 | Morgan | 252/8.5 |

(2)

| | | | |
|---|---|---|---|
| 2,883,351 | 4/1959 | Uraneck et al. | 260/175 |
| 2,980,610 | 4/1961 | Ruehrwein | 210/58 |
| 2,981,630 | 4/1961 | Rowland | 106/288 |
| 2,995,512 | 8/1961 | Weidner et al. | 210/54 |
| 3,128,249 | 4/1964 | Pye et al. | 210/53 |
| 3,130,167 | 4/1964 | Green | 252/181 |
| 3,157,595 | 11/1964 | Johnson et al. | 210/54 |

FOREIGN PATENTS

| | | |
|---|---|---|
| 163,501 | 8/1952 | Australia |
| 163,502 | 8/1951 | Australia |
| 477,265 | 9/1951 | Canada |

OTHER REFERENCES

Baker, H. C., The Concentration of Latex by Creaming, Transactions of the Institution of the Rubber Industry, 13, No. 1, pp. 70-82 & 84 (June 1937). Also Rubber Chem. Tech. 11, 75 (1938).

Guillot, M. and Fierrer, A., Le Sang 19 pp. 59-61 (1948).

Hauser, E. A., Micromanipulation of Latex in the Dark Field, Rubber Chemistry and Technology, 4, pp. 219-222, (1931).

Hauser, E. A. & Dewey, Jr., Bradley, Creaming of Rubber Latex, Industrial Engineering Chemistry, 33, pp. 127-130 (Jan. 1941).

Michaels, Aggregation of Suspensions by Polyelectrolytes, Industrial & Engineering Chemistry, 46, No. 7, (July 1954) pp. 1485-1490.

Michaels and Morelos, Polyelectrolyte Adsorption by Kaolinite, Industrial & Engineering Chemistry, 47, No. 9, (Sept. 1955) pp. 1801-1809.

Noble, Royce J., Latex in Industry, The Rubber Age, 1936, p. 36.

Sulzer, R., Helvetica Physiologica et Pharmacologica Acta, 8, 351-7 (1950).

Colloid Chemistry, Alexander, Jerome, Ed., 6, Reinholdt Pub. Corp. New York (1946) p. 782.

Chemistry and Technology of Rubber, Davis-Blake, ACS Monograph, Reinhold Publishing Co., New York (1937), pp. 605-611.

The Chemistry of Rubber, Luff, Ernest Benn Ltd. London, (1923), pp. 24-29.

Colloidal Science, Kruyt, H. R. Ed., Vol. I., Elsevier Pub. Co. New York (1952), pp. 4 & 6.

Hackh's Chemical Dictionary, 3rd Ed., The Blakiston Co. Inc. New York (1953).

The Hydrous Oxides, Weiser, McGraw-Hill Book Co., New York (1926) pp. 26-27, 55-57 and 119-121.

Latex, E. A. Hauser, Chemical Catalog Company (1930), pp. 62-69.

The Nature & Properties of Soils - Ty. Lyttleton Lyon and Harry O. Buckman, Macmillan Company, New York, 4th Edition, (1947) pp. 59, 60 and 84.

Natural Plant Hydrocolloids, Advances in Chemistry Series A.C.S. (1954), pp. 25, 34, 51 and 52.

Organic Chemistry, Karrer, Paul, Nordemann, New York (1938) p. 271.

An Outline of Organic Nitrogen Compounds, Degering, Ed., University Lithographers, Ypsilanti, Michigan (1950) pp. 405 to 408.

Outlines of Theoretical Chemistry - Getman and Daniels, John Wiley & Sons, New York (1931) pp. 221, 222 and 223.

Physical Chemistry - Moore, Walter J., Prentice - Hall, Inc., New York (1950) p. 508.

Physical Chemistry - Prutton and Maron, Macmillan Company, New York (1948) pp. 238 and 253.

Rubber Technology, Moakes et al., Academic Press, Inc., New York (1951) pp. 16-19.

Soil Physics, L. D. Bayer, John Wiley & Sons, New York, 2nd Edition (1948) p. 139.

Technology of Rubber, Gottlob, translated by Rosenbaum, Maclaren and Sons, Ltd., London (1927) p. 2.

Treatise on Physical Chemistry - Taylor and Glasstone, D. Van Nostrand Co., New York (1951) Vol. II., pp. 512, 660 and 661.

3,418,237

(4)

Vanderbilt Rubber Handbook, Rogers, S. S., Ed., R. T. Vanderbilt Co. New York (1948).

Vinyl and Related Polymers, Schildknecht, Calvin E., John Wiley and Sons, Inc. New York, (1952) pp. 248, 270 and 271.

The Water-Soluble Gums, Mantell, Charles F., Reinhold, New York (1947) pp. 48, 85, 124, 130 & 131.

Webster's New International Dictionary 2nd Edition, G. & C. Merriam, Springfield, Mass. (1937).

Interferences 87,633; 88,054 and 93,991. In re Booth and Dobson 50 CCPA 764; 310 F.2d 956; 135 USPQ 440; 786 O.G. 960 (CCPA 1962).

Signed and sealed this 24th day of March 1970.

(SEAL)
Attest:

EDWARD M. FLETCHER, JR.
Attesting Officer

WILLIAM E. SCHUYLER, JR.
Commissioner of Patents